United States Patent
Kawashima et al.

(10) Patent No.: US 6,859,702 B2
(45) Date of Patent: Feb. 22, 2005

(54) SUSPENSION CONTROL APPARATUS

(75) Inventors: Mitsunori Kawashima, Wako (JP); Shinji Suto, Wako (JP); Hirokazu Kitazawa, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/211,006

(22) Filed: Aug. 2, 2002

(65) Prior Publication Data

US 2003/0033063 A1 Feb. 13, 2003

(30) Foreign Application Priority Data

Aug. 8, 2001 (JP) ....................................... 2001-240879

(51) Int. Cl.$^7$ ......................... B60K 16/00; G06F 19/00
(52) U.S. Cl. .......................................... 701/37; 280/5.5
(58) Field of Search ............................. 701/37, 38, 39; 280/5.5, 5.502, 5.506, 5.507, 5.512, 5.514, 5.515

(56) References Cited

U.S. PATENT DOCUMENTS

| 5,091,679 A | * | 2/1992 | Murty et al. ................. 318/153 |
| 5,097,171 A | * | 3/1992 | Matsunaga et al. ..... 310/316.01 |
| 5,296,785 A | * | 3/1994 | Miller ......................... 318/254 |

* cited by examiner

*Primary Examiner*—Gary Chin
(74) *Attorney, Agent, or Firm*—Merchant & Gould P.C.

(57) ABSTRACT

The invention provides a suspension control system that executes control of actuators that apply a vertical force to the vehicle wheels depending on the travel state of the vehicle, and at the same time, carry out power generation by using the energy of the vertical motion of the wheels and use the obtained energy to drive the actuator motor. In the suspension control apparatus in which the vehicle wheels can receive a force in the vertical direction from a motor, power generation is carried out by the motor depending on the vertical motion of the vehicle wheels, and a storage cycle that stores energy in a storage apparatus and a discharge cycle that drives the motor by the energy stored in the storage apparatus are repeated.

2 Claims, 14 Drawing Sheets

SUSPENSION CONTROL APPARATUS

BACKGROUND OF THE INVENTION

1. Field of the Invention

The current invention relates to a control system for a suspension provided on a vehicle such as an automobile, and in particular, relates to a control apparatus for a suspension provided with an actuator that applies a force to the vehicle wheels in a vertical direction.

2. Description of the Related Art

The suspension provided on a vehicle has the function of improving the ride comfort by absorbing shocks from the road surface with which the wheels are in contact, and generally, coil springs and shock absorbers that suppress the vibration of these coil springs are provided. When the spring rate of the coil spring provided on the suspension is made small, the ride comfort had a tendency to become smooth.

In contrast, when the spring rate is made small in order to make the ride comfort smooth, rolling occurs easily during the turning of the vehicle, pitching occurs easily during the acceleration and deceleration of the vehicle, and there is a tendency for controllability to decrease.

As explained above, because it is difficult to improve controllability and ride comfort of the vehicle together, generally the suspension of a vehicle is frequently set prioritizing either the ride comfort or prioritizing the controllability, depending on the characteristics of the vehicle.

In addition, stabilizers for increasing the roll resistance of the vehicle are conventionally known. In the case that the left and right wheels move in phase, the stabilizer does not act as a spring, but in the case that the left and right wheels move out of phase as happens during rolling, the stabilizer acts as a spring and thereby rolling is suppressed. Because the stabilizer acts as a spring only in the case that the left and right wheels are moving out of phase, rolling can be suppressed even if the spring rate of the coil panel is not made large.

When the spring rate of the coil spring is made small in order to improve the ride comfort, rolling can easily occur during turning, and thus it is necessary to make the reaction force produced by the stabilizer large by making the diameter of the stabilizer large or making the length of the part that generates the torsion short.

However, when the reaction force generated by the stabilizer is made large, in the case of driving straight on a road surface having irregular bumps and holes, the result is the same as having made the spring rate of the coil spring large, and there is the problem that the ride comfort is adversely influenced. In addition, the stabilizer can only suppress rolling, and it is not possible to attain the effect of suppressing pitching and bouncing.

In consideration of the problems described above, it is an object of the current invention to provide a suspension control apparatus that executes control of an actuator that applies a force to the vehicle wheels in the vertical direction depending on the state of travel of the vehicle, and at the same time, carries out electrical generation by using the energy of the vertical movement of the vehicle wheels, and uses the obtained electrical energy to drive the actuator.

SUMMARY OF THE INVENTION

A first aspect of the invention is a suspension control apparatus wherein the vehicle wheels can receive a force applied in the vertical direction by motors (for example, the motors ML and MR in the embodiments), wherein this suspension control apparatus carries out electrical power generation by the motor depending on the vertical movement of the vehicle wheels, and a storage cycle that stores electricity in a storage apparatus (for example, the battery BAT in the embodiments) and a discharge cycle in which the motor is driven by the electrical power stored in the storage device are repeated.

According to this invention, because electrical generation is carried out by the motor depending on the vertical movement of the vehicle wheels and a charge cycle that stores electricity in a storage apparatus and a discharge cycle that drives a motor by electrical power stored in the storage device are repeated, and thereby the effect can be attained that the consumption of power necessary for driving the motor that controls the suspension can be reduced. As a result, it becomes possible to provide a motor for carrying out control of the suspension without having to increase the storage capacity of the battery originally provided for driving the electrical equipment of the vehicle.

A second aspect of the invention is a suspension control apparatus comprises two storage members whose storage apparatuses have differing storage capacities, where a connection control device (for example, the power relay RE in the embodiments) controls the connection between the main storage member (for example, the battery BAT in the embodiment) having a larger storage capacity and the motor, and during the storage cycle the connection between the main storage member and the motor is cut by the connection control device, and the auxiliary storage member having the small storage capacity (for example, the capacitor C in the embodiments) is charged.

According to this invention, a suspension control apparatus comprises two storage members whose storage apparatuses have differing storage capacities, where a connection control device controls the connection between the main storage member having a large storage capacity and the motor, and during the storage cycle the connection between the main storage member and the motor is cut by the connection control device, and the auxiliary storage member having the small storage capacity is charged, and thereby the effects are attained that the charge and discharge can be realized without providing a complicated control circuit for carrying out the charge and discharge of the auxiliary storage apparatus having the small storage capacity, and the structure can be simplified.

A third aspect of the invention is a suspension control apparatus that drives the motor by the auxiliary storage member when carrying out control of the ride comfort of the vehicle (for example, sky hook control in the embodiments) and drives the motor by the main storage member when carrying out control other than the ride comfort of the vehicle (for example, roll suppressing control and pitching suppressing control in the embodiments).

According to this invention, during control for improving the ride comfort of the vehicle during forward travel in a normal area, the motor is driven by the electrical power stored in the auxiliary storage apparatus, and thereby the effects can be attained that the reducing of necessary power consumption can be effectively implemented, and further energy reductions can be implemented.

DETAILED DESCRIPTION OF THE INVENTION

In the invention of the current application, by supplementing the spring rate of the spring in the suspension by the torque generated by the actuator, controllability and ride comfort become compatible, and at the same time, power generation is carried out using the energy of the vertical motion of the wheels and the actuator that generates torque is driven by the obtained electrical power.

Therefore, depending on the conditions of travel of the vehicle, because the firmness of the ride of the vehicle can be substantially increased and the leaning of the vehicle due to rolling and pitching can be mitigated, the stability of the travel of the vehicle can be attained, and at the same time, the ride comfort of the passengers can be improved.

When setting the spring rate of the spring to a large value from the beginning in order to increase the rigidity of the vehicle, in a state of driving forward in the road surface, the ride comfort deteriorates because the vehicle directly receives the shock due to irregularities in the road surface.

However, according to the invention of the current application, the torque generated by the actuator compensates the difference between the spring rate for obtaining rigidity of the vehicle necessary during cornering and declaration by setting the spring rate of the spring to a value that can reduce the shock due to the condition of the road surface during forward travel, and thus the controllability and ride comfort can be improved. Furthermore; the charge cycle in which the storage apparatus is charged and the discharge cycle in which the motor is driven by the electrical power stored in the storage apparatus is repeated, and thus consumption of electrical power necessary for driving the motor that controls the suspension can be saved.

Below, the embodiments of the current invention will be explained with reference to the drawings.

Figure 1:
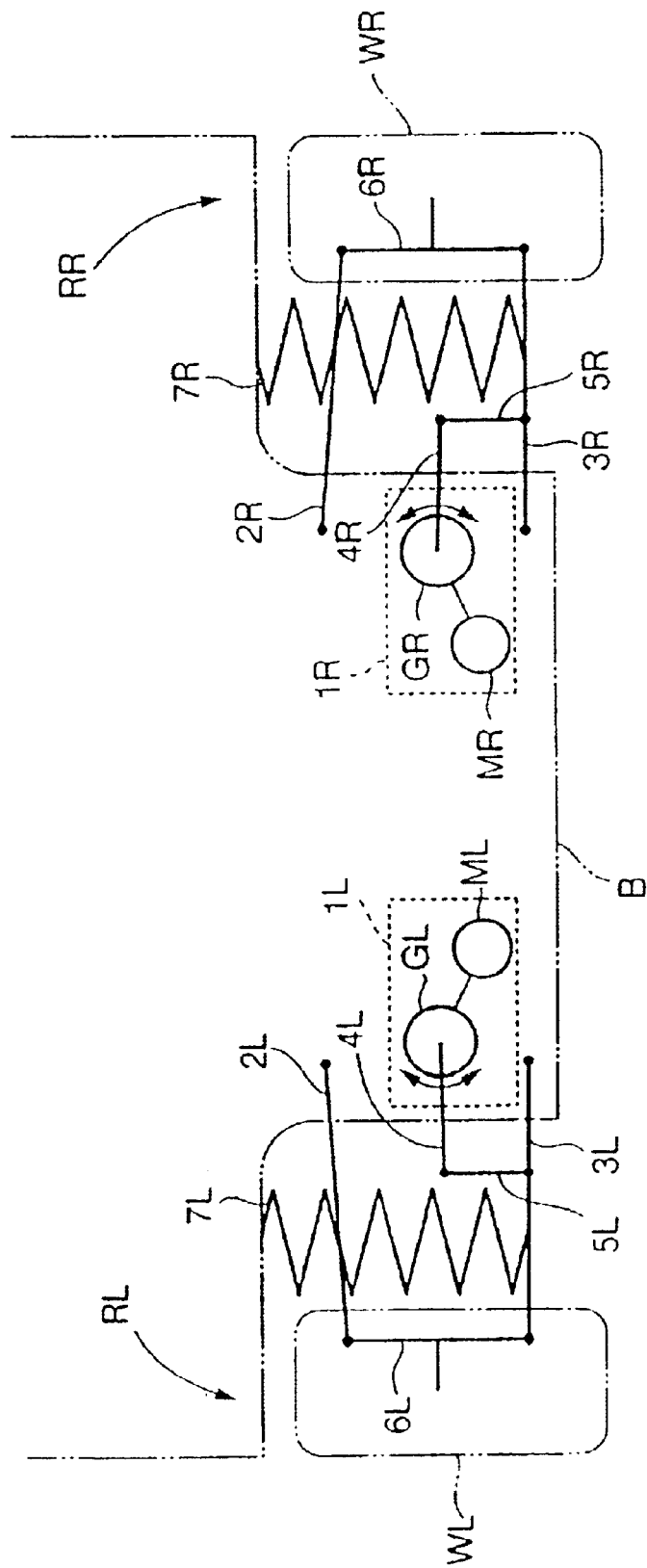
FIG. 1 is an illustration from the back of a vehicle showing the structure of the suspension in the rear according to the present invention.

FIG. 1 is a perspective drawing from the back of the vehicle showing the structure of the suspension in the rear (rear wheels) side of the vehicle according to an embodiment of the current invention.

In the suspension of the rear wheel in this figure, the knuckle 6L that supports freely rotating wheel WL is supported so as to be able to move vertically by the A-shaped upper arm 2L and the lower arm 3L. The upper arm 2L is connected to the upper part of the knuckle 6L by the joint provided at the distal end, and connected to the vehicle body B by the joint provided on the proximal end. The lower arm 3L is connected to the lower part of the knuckle 6L by the joint provided at the distal end, and connected to the vehicle body B by the joint provided at the proximal end. The lower part of the spring 7L is supported by the center part of the lower arm 3L, and the upper part of the spring 7L is supported by the vehicle body B. The actuator 1L is connected via the link 5L and the drive arm 4L to the proximal end of the lower arm 3L. In addition, a shock absorber (not illustrated) is provided between the vehicle body B and the lower arm 3L. Here, the actuator 1L is formed by the decelerator GL and the motor ML. The torque generated by the motor ML increases depending on the deceleration ratio of the decelerator GL, and is applied to the lower arm 3L.

Furthermore, the suspension of the right rear wheel has an identical structure, except that the 'L' in the accompanying reference numerals for the essential components described above has been changed to 'R'.

In addition, the front parts of the knuckle 6L and the knuckle 6R are connected together by a stabilizer (not illustrated), and each of the back parts of the vehicle body B, the knuckle 6L, and the knuckle 6R are connected by a lateral link (not illustrated).

Due to this structure, in the suspension of the back left wheel, the vehicle body B moves vertically with respect to the road surface due to cornering, and the lower arm 3L and the upper arm 2L connected to the knuckle 6L move vertically with the proximal end connected to the vehicle body B serving as the starting point. Thereby, the spring 7L and the shock absorber connected to the lower arm 3L expand and contract depending on the vertical motion, and the vertical motion of the vehicle body B with respect to the road surface is absorbed. At this time, the actuator 1L is driven, and when the drive arm 4L is rotated in a direction identical to that of the axis of rotation, the torque (N·m) of the vertical motion is transmitted to the lower arm 3L connected via the link 5L to the drive arm 4L, and the spring rate of the spring 7L is compensated.

In addition, at the same time, in the suspension of the rear right wheel as well, simply by changing the accompanying reference numerals for the essential components from 'L' to 'R', a movement identical to that of the movement of the suspension of the left rear wheel is carried out. Thereby, by linking together the actuators 1L and 1R provided in the wheel WL and the wheel WR and carrying out control, the spring rate of the springs 7L and 7R can be compensated, and the leaning of the vehicle body due to rolling and pitching can be actively controlled.

That is, the suspension of the rear left wheel shown in FIG. 1 depends on the vertical movement of the vehicle body B due to cornering and the like, and in the case that the spring 7L connected to the lower arm 3L expands and contracts, depending on the amount of this expansion or contraction, a torque is applied to the vehicle body B, and this works to correct the leaning of the vehicle body B.

Below, for ease of explanation, each of the torques applied to the lower arms 3L and 3R when the actuators 1L and 1R rotate the drive arms are denoted by TTL and TTR.

Figure 15:
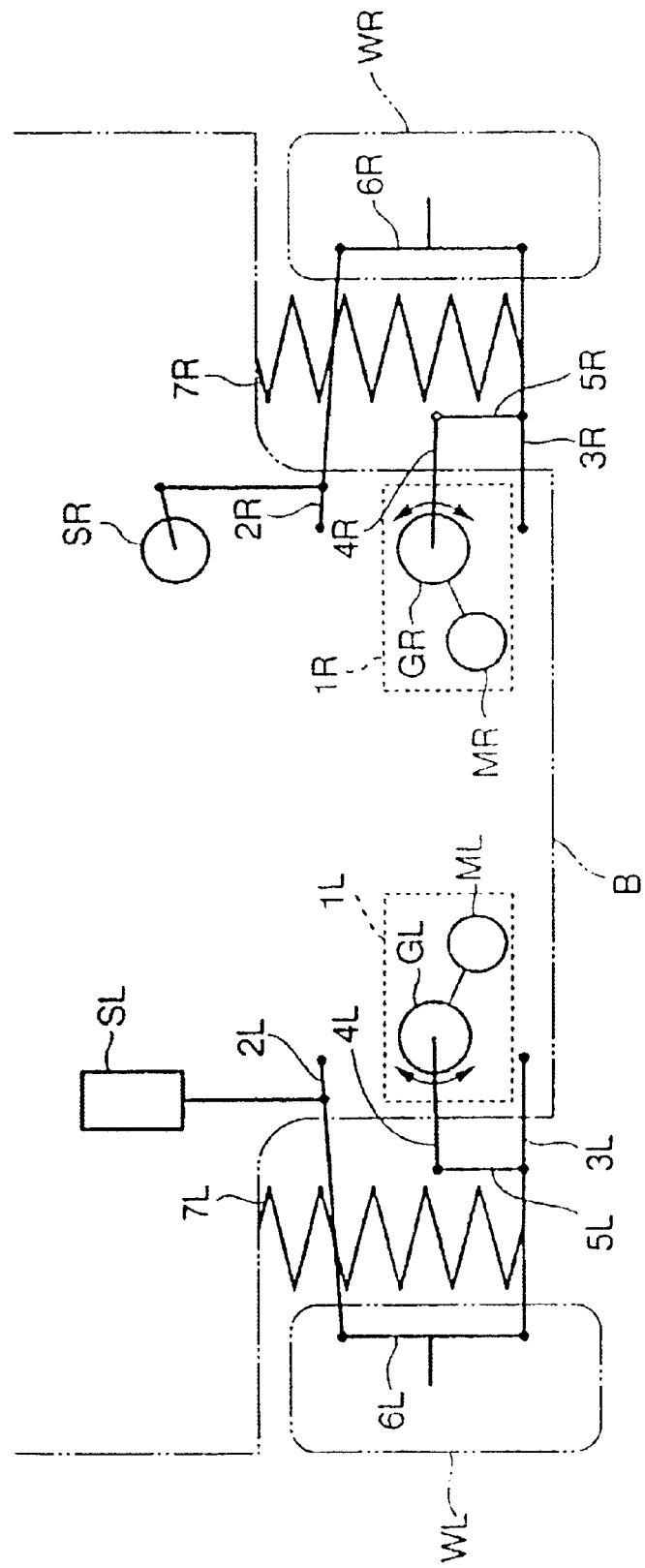
FIG. 15 is an explanatory drawing showing the disposition of the sensors that detect the state of the vehicle body B.

Here, the suspension that detects the state of the vehicle body B will be explained with reference to FIG. 15 and FIG. 16. FIG. 15 is an explanatory drawing showing the disposition of the stroke sensor installed on the vehicle body B in order to detect the amount of the suspension stroke shown in FIG. 1. In this figure, reference symbols SL and SR are stroke sensors that detect and output the relative amount of the movement (stroke amount) of the vehicle body B at the lower arm 3L. The example shown in FIG. 15 is one wherein a stroke potentiometer is installed in the suspension of the rear left wheel to serve as the stroke sensor SL. In the example shown here, the stroke sensor SL is installed in the vehicle body B, and joined to the upper arm 2L by a link. In, addition, the suspension of the rear right wheel is an example using a rotating potentiometer as the stroke sensor SR, and the amount of movement of the upper arm 2R is detected by the rotation angle. The stroke sensors SL and SR are not limited to stroke or rotating type potentiometers, and any sensors that can detect the amount of the stroke of the suspension can be used.

What here is being called the stroke amount is the value corresponding to the amount of the displacement of the springs 7L and 7R, and thus any sensor that can detect the amount of each of the displacements of the springs 7L and 7R can be used. For example, the amount of the left and right stroke corresponding to the acceleration applied in the transverse direction of the vehicle B can be found in advance, and then depending on the acceleration detected by the acceleration sensors, the stroke amount can be found in by referring to stroke amounts found in advance.

Figure 16:
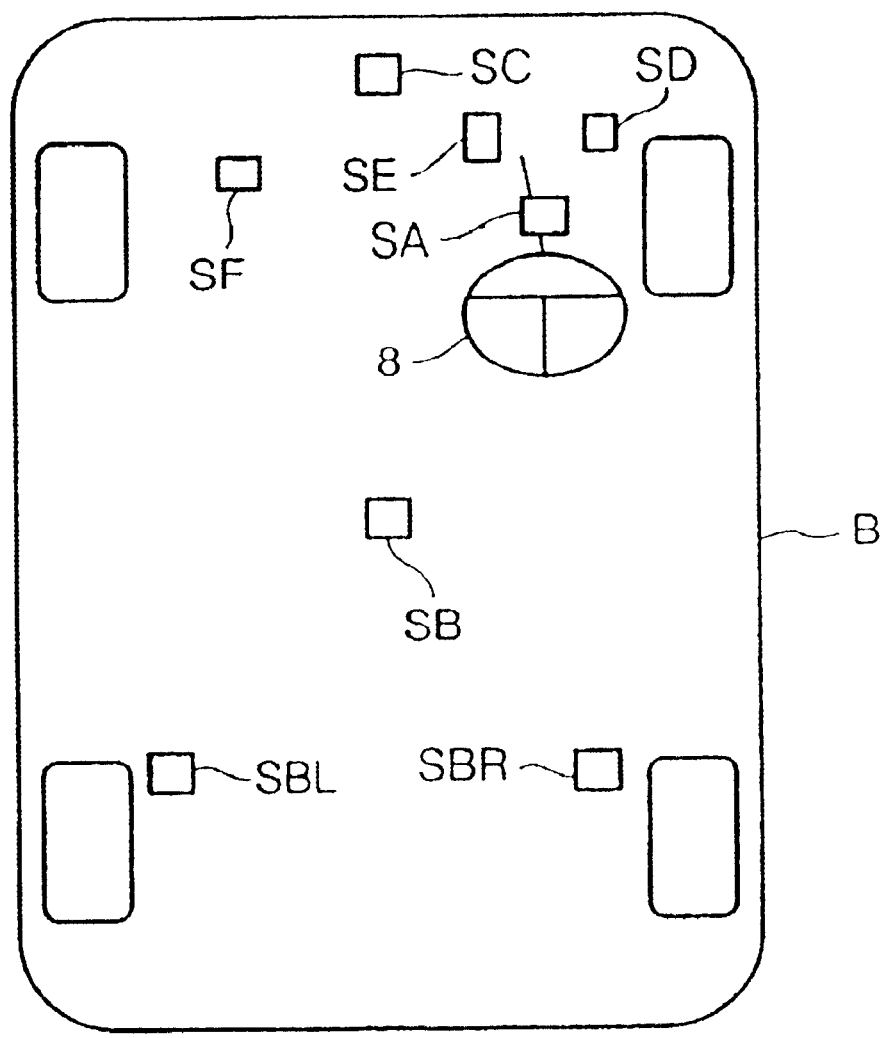
FIG. 16 is an explanatory drawing showing the disposition of the sensors that detect the state of the vehicle body B.

FIG. 16 is a schematic diagram viewing the vehicle from above. In this figure, reference symbol SA is a steering angle sensor that detects and outputs the steering angle and the steering direction of the steering wheel 8. The steering angle sensor SA outputs a signed numerical value, and for example when steering to the left, a positive numerical value that depends on the angle of the steering is output, and when steering to the right, a negative numerical value that depends on the angle of the steering is output. Reference symbol SB is an acceleration sensor that is installed at the position of the center of gravity of the vehicle body and detects the acceleration of the vehicle body B in the vertical direction (the direction perpendicular to the road surface). Reference symbol SC is an acceleration sensor that is installed at a forward position in the vehicle body B, and detects and outputs the acceleration in the forward direction of the vehicle body B. Reference symbol SD is an accelerator opening sensor that detects and outputs the opening of the accelerator. Reference symbol SE is a leg-power sensor that detects and output the leg power on the brake petal. Reference symbol SF is a vehicle speed sensor that detects and outputs the speed of the vehicle.

Moreover, an acceleration sensor that detects the acceleration of the vehicle body B in the vertical direction can be installed on each of the left and right rear damper mount of the vehicle body B, as shown by reference symbols SBL and SBR. When the acceleration sensors that detect the acceleration in the vertical direction in this manner are installed at positions on both the left and right suspension, the state of the vehicle body B can be detected in more detail.

In addition, the control of the actuators 1L and 1R and the detection of the output of the stoke sensors SL and SR, the steering angle sensor SA, the acceleration sensor SB, and the acceleration sensor SC are carried out by a control unit. This control unit is formed by a CPU and a storage unit such as memory, and the CPU carries out control of the actuators 1L and 1R following a program stored in the storage unit.

Figure 2:
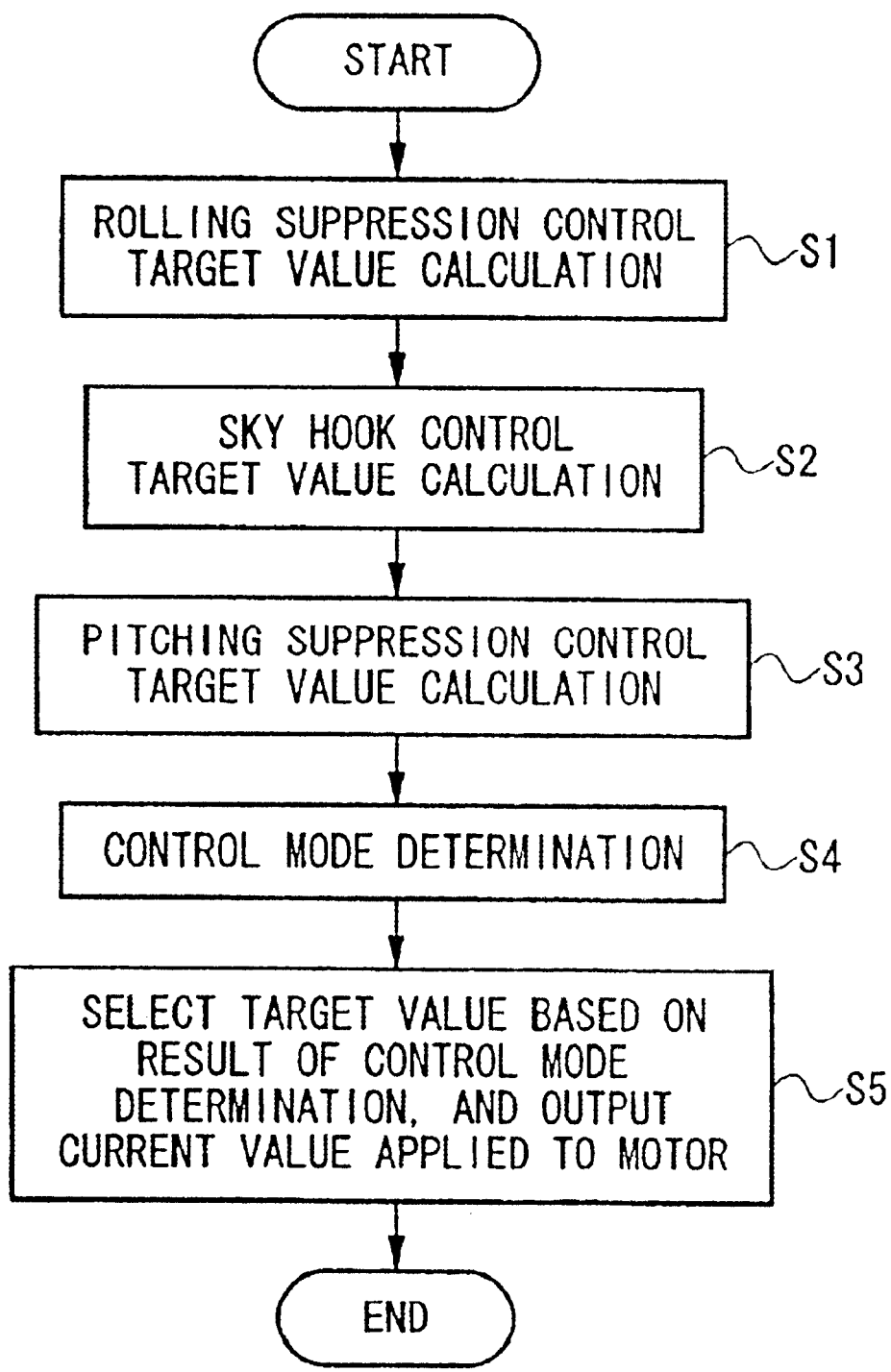
FIG. 2 is a flowchart showing the main processing for the control of the suspension shown in FIG. 1.

Next, the operation in which the control unit carries out control of the suspension shown in FIG. 1 will be explained with reference to FIG. 2 to FIG. 8. FIG. 2 is a flowchart showing the main processing of the suspension control operation. First, the control unit detects the state of the vehicle B at the current point in time, and then calculates the target values necessary when carrying out control for suppressing the rolling of the vehicle body B (step S 1). The target values used in the following explanation are the target torque (TTL and TTR) generated by the actuators 1L and 1R and the rotation direction that generates this torque.

Moreover, the processing in step S 1 is explained later in detail with reference to FIG. 3 to FIG. 5.

Next, the control unit detects the state of the vehicle body B, and calculates the target values necessary for carrying out the sky hook control for improving the ride comfort in the case that the vehicle is in a state of forward motion (step S 2). Sky hook control denotes control in which the vibration of the spring (vehicle body B) is dampened by an actuator based on the Sky Hook Theorem.

Figure 6:
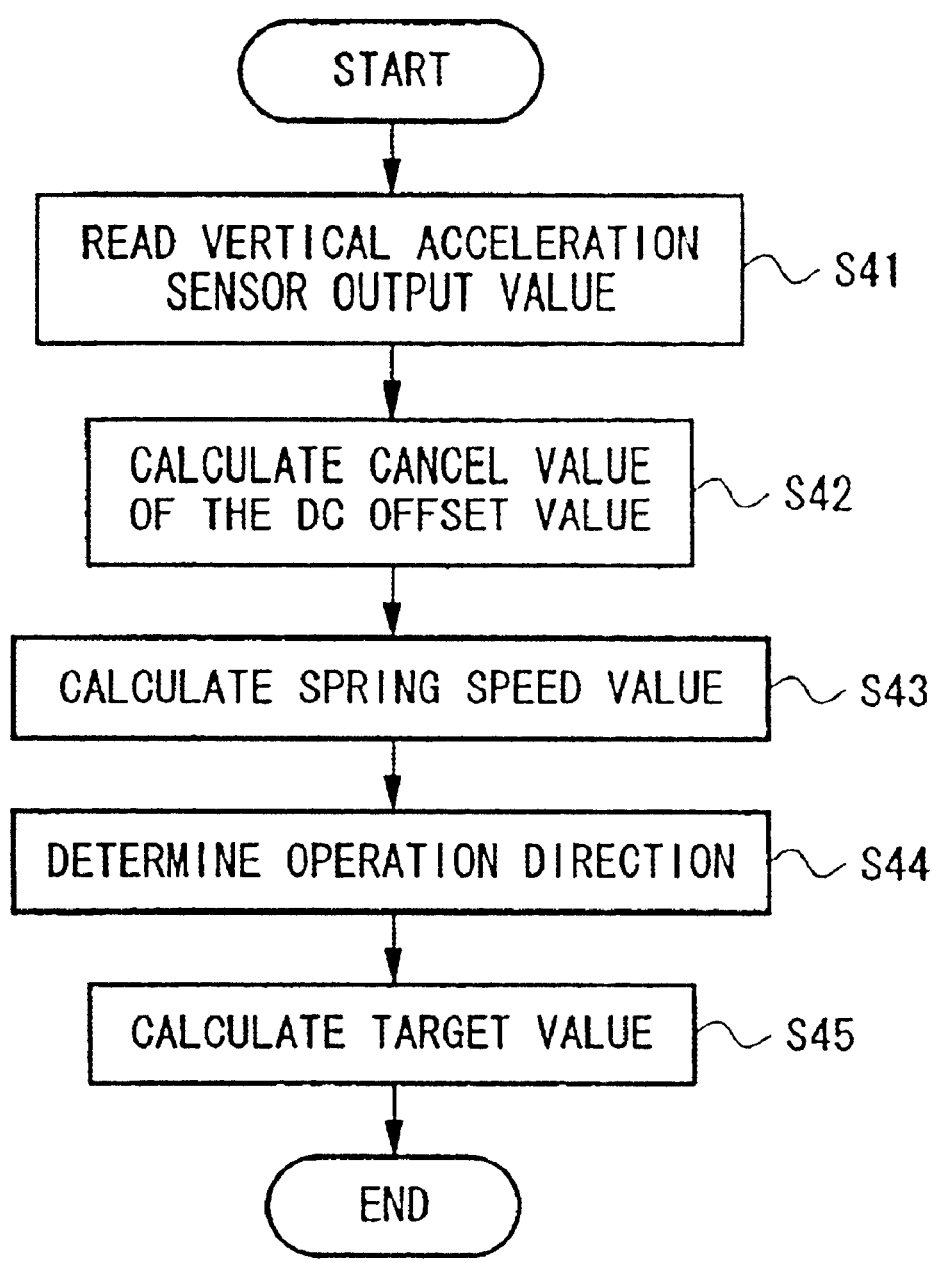
FIG. 6 is a flowchart showing the detailed processing in step S 2 shown in FIG. 1.

Moreover, the processing in step S 2 is explained later in detail with reference to FIG. 6.

Next, the control unit detects the state of the vehicle body B at the current point in time, and calculates target values necessary for carrying out control for suppressing pitching of the vehicle body B (step S 3).

Figure 7:
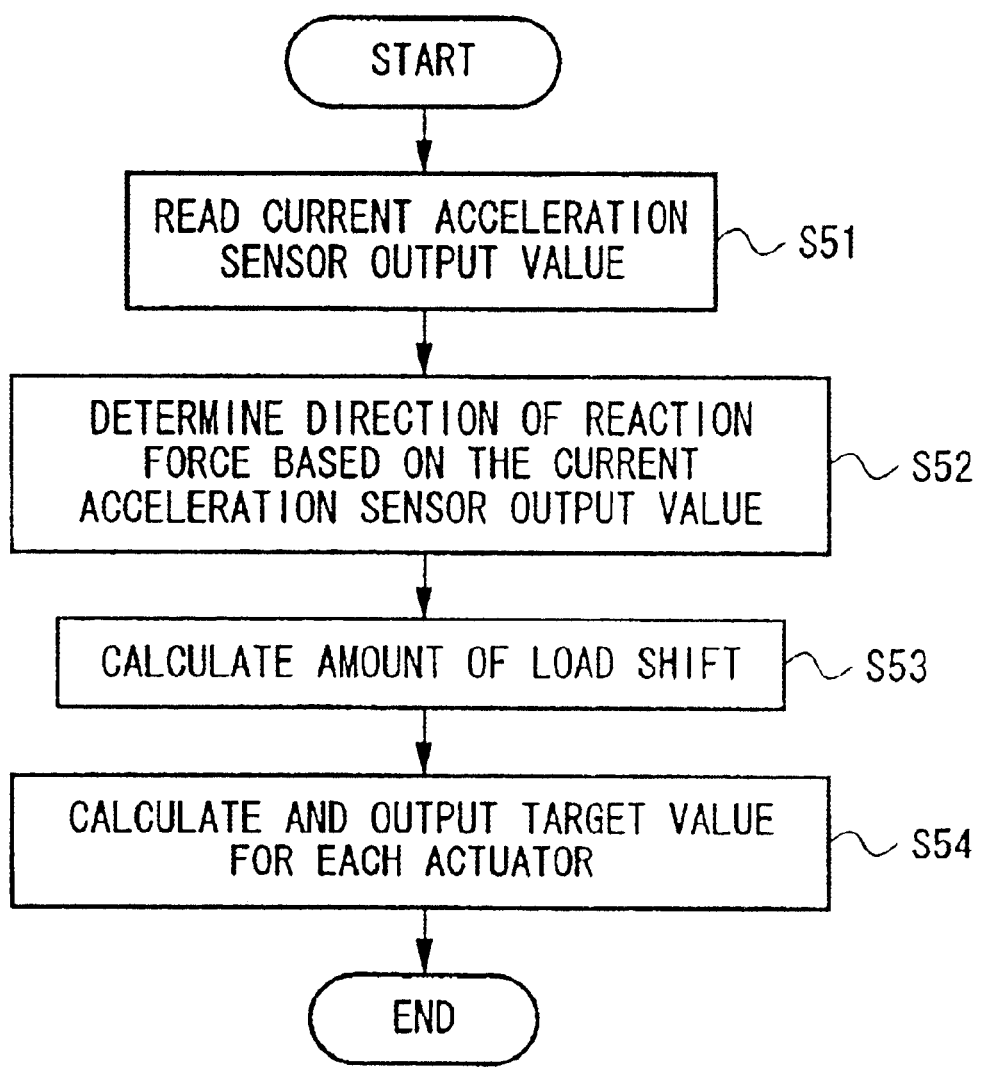
FIG. 7 is a flowchart showing the detailed processing in step S 3 shown in FIG. 1.

Moreover, the processing of step S 3 is explained later in detail with reference to FIG. 7.

Next, the control unit determines the control mode depending on the state of the vehicle body B at the current point in time (step S 4). The determination of the control mode denotes determining the control of the suspension at the current point in time by determining which among three types of control (roll suppressing control, sky hook control, pitching suppressing control) described above is appropriate for carrying out control depending on the state of the vehicle B at the current point in time.

Here, the target values for carrying out the three controls are always calculated because thereby the change in the state of the vehicle can be responded to rapidly.

Next, the control unit selects the target values calculated in steps S 1, S 2, and S 3 based on the control mode determining results, finds the current amount depending on these target values, and outputs them to the motors ML and MR (step S 5).

For example, in the case that the control unit controls the torque of the motors ML and MR by PWM (pulse width modulation) control, in a constant cycle, the duty ratio of the width of the H level and the L level is found by the calculations depending on the target values, and the amount of current supplied to the motors ML and MR is adjusted.

At this time, in the case that the current is to be made small in order to reduce the torque, the control unit calculates the duty ratio so that the width of the H level is widened and the width of the L level is narrowed, and in the case that the current is to be made small in order to reduce the torque, the width of the L level is widened and the width of the H level is narrowed. In addition, the direction in which the torque is generated is controlled by reversing the direction of the current flowing to the motors ML and MR.

Below, for the sake of explanation, the current direction that generates a torque TL in the direction that expands the spring 7L by the actuator 1L is defined as "+", and the current direction that generates a torque TL in the direction that contracts the spring 7L by the actuator 1L is defined as "−".

Similarly, the current direction that generates a torque TR in the direction that expands the spring 7R by the actuator 1R is defined as "+", and the current direction that generates a torque TR in the direction that contracts the spring 7R by the actuator 1R is defined as "−".

Moreover, FIG. 2 shows the execution of the processing of steps S 1 to S 3 in sequence, but the calculation of three target values can be calculated simultaneously in parallel. Thereby, the period during which the control operation shown in FIG. 2 is executed can be shortened.

In this manner, depending on the state of the vehicle body B, either the roll suppressing control, sky hook control, or pitching control is selected, and control of the suspension is carried out. Thereby, the controllability and the ride comfort of the passengers can be improved together.

Next, the operation of calculating the target values in the case of carrying out the roll suppressing control shown in step S 1 in FIG. 2 will be explained with reference to FIGS. 3 to 5. FIGS. 3 to 5 are flowcharts showing the processing in which the control unit calculates the target values for carrying out control of the actuators 1L and 1R.

It is assumed in this operation that the driver is riding in the vehicle, and that by turning on the ignition switch, the control unit stores in the storage unit the measured values MDL and MDR (unit: mm) output by the stoke sensors SL and SR at this point in time as the respective reference values DL and DR (unit: mm).

Figure 3:
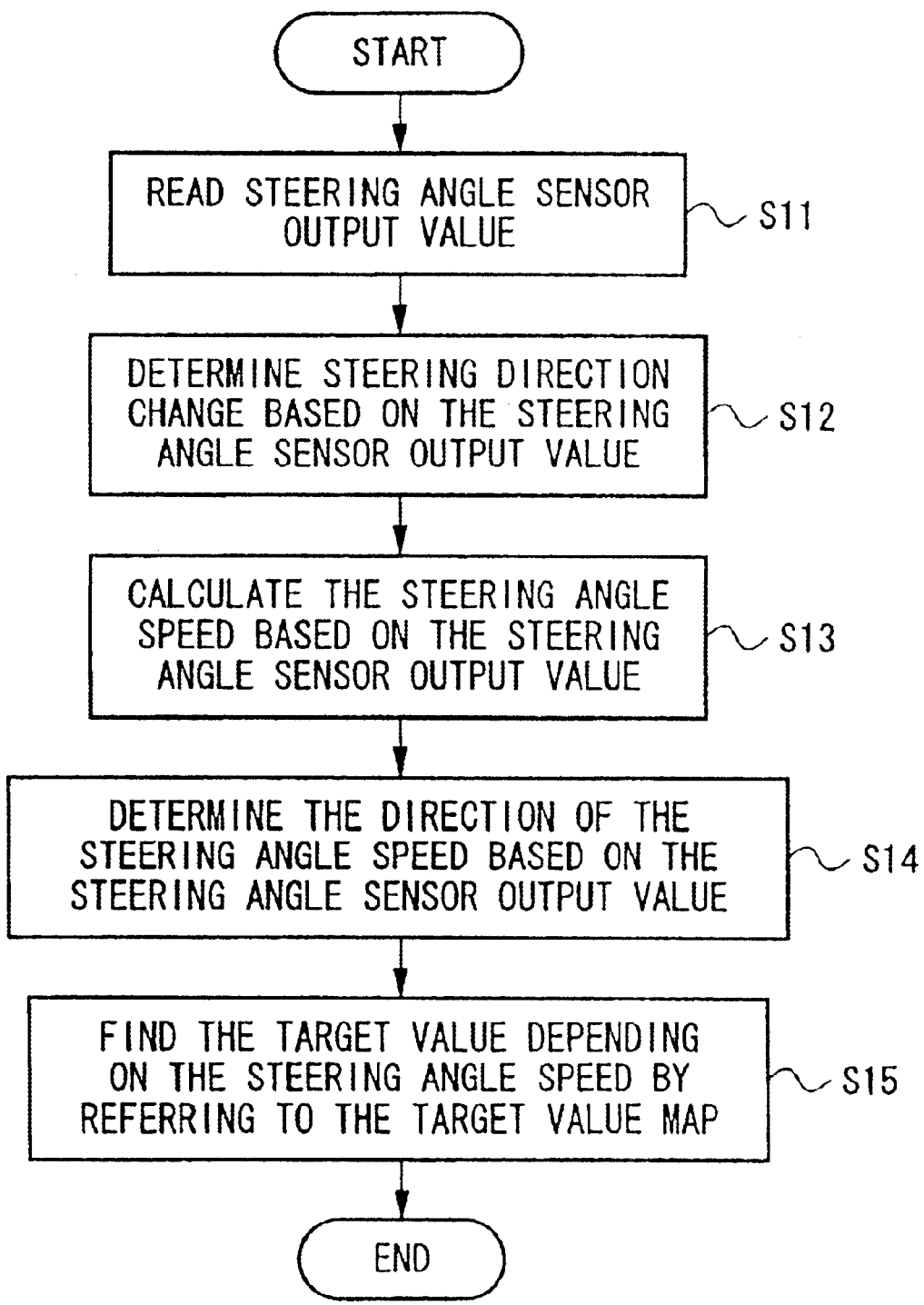
FIG. 3 is a flowchart showing the detailed processing in step S 1 shown in FIG. 1.
Figure 4:
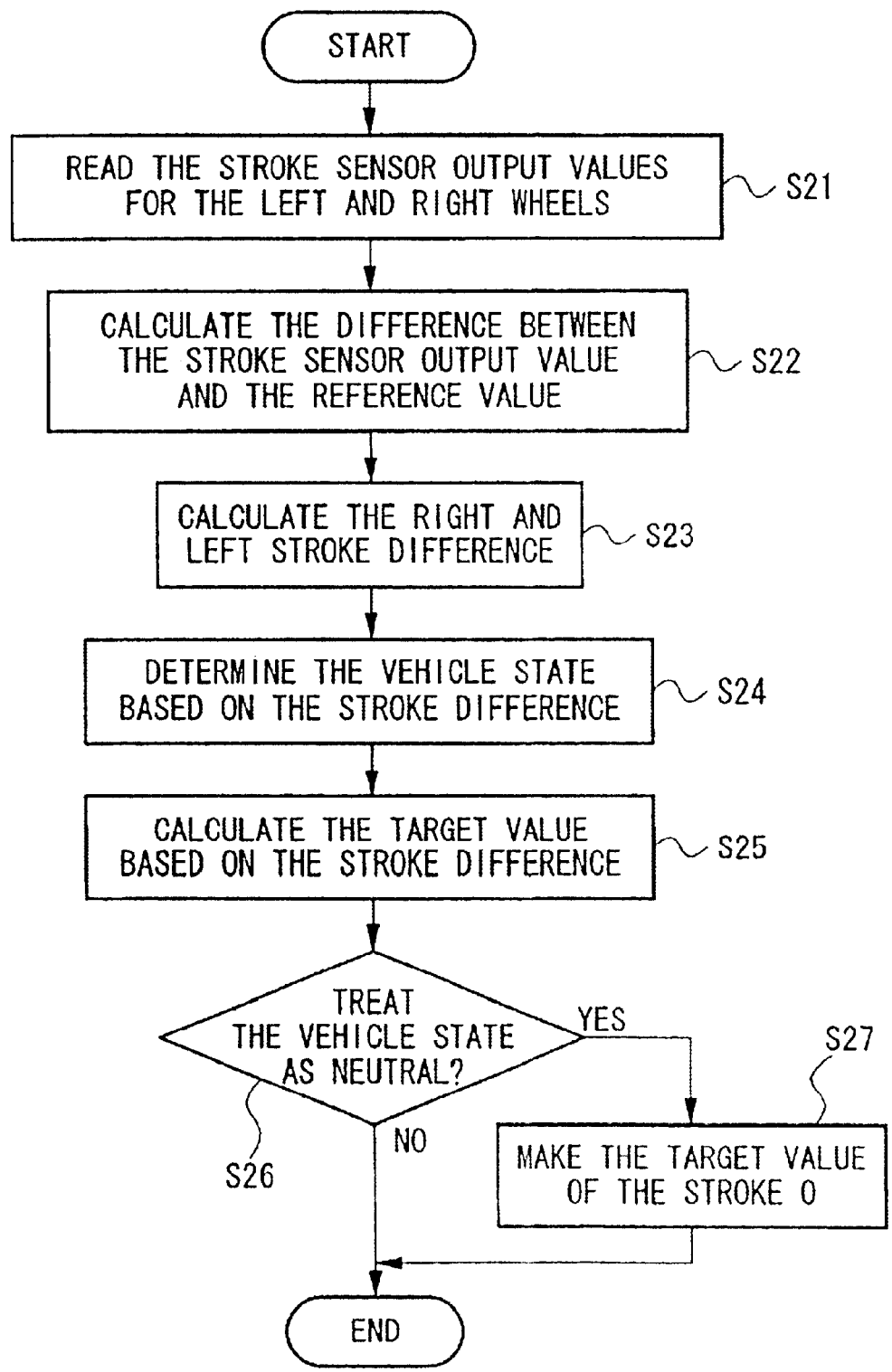
FIG. 4 is a flowchart showing the detailed processing in step S 1 shown in FIG. 1.
Figure 5:
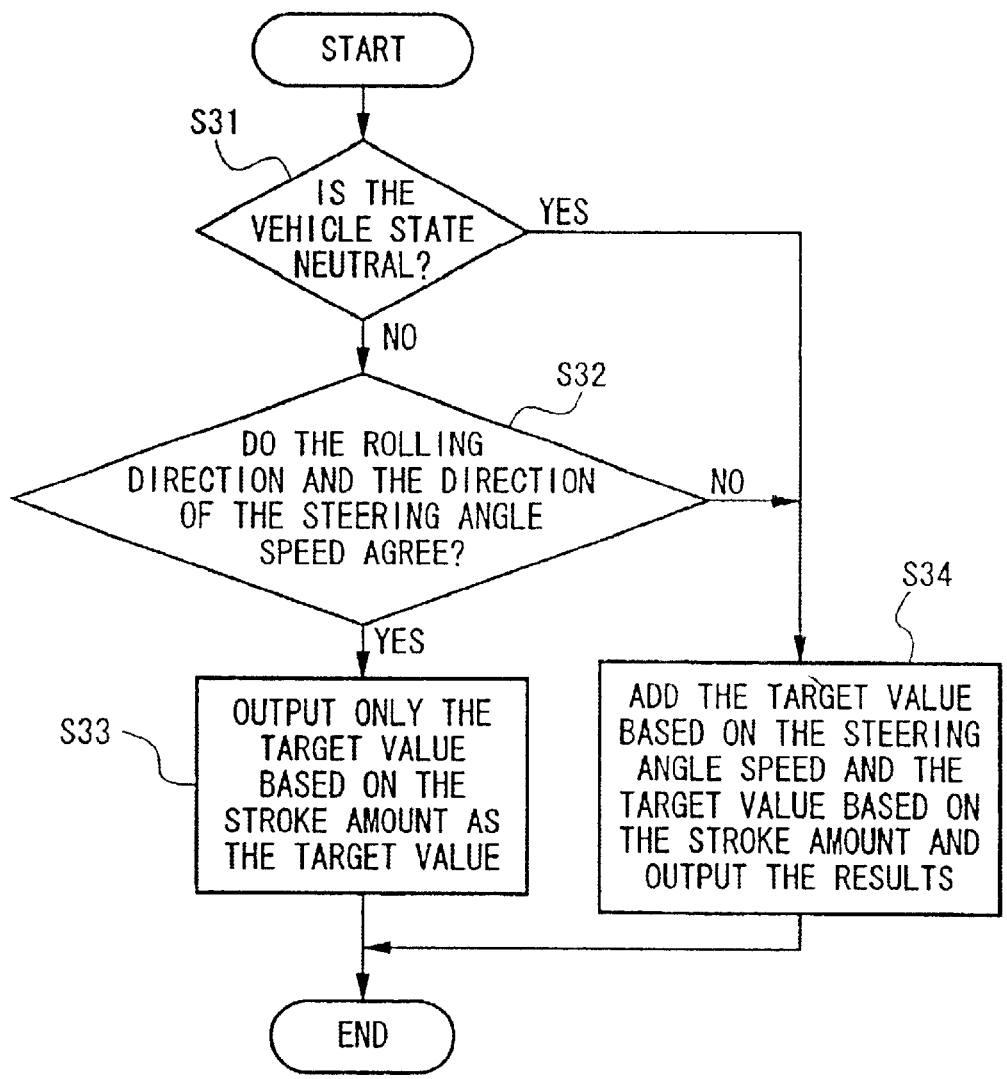
FIG. 5 is a flowchart showing the detailed processing in step S 1 shown in FIG. 1.

In addition, the control unit starts the processing of each of the flow charts shown in FIGS. 3 to 5 following a program.

The processing in these flow charts is repeated as one set of processes at each predetermined time interval (for example, every 10 msec), and based on the obtained results, the control of the generation of the torques TTL and TTR generated by each of the actuators 1L and 1R is carried out for each time interval.

First, with reference to FIG. 3, the calculation processing of the target values based on the speed of the steering will be explained. The torques TL and TR generated by the actuators 1L and 1R based on the speed of the steering are found by this processing.

First, the control unit reads the amount of the steering angle amount output by the steering angle sensor (step S 11). Next, the control unit determines the direction of the steering based on the output value of the steering angle sensor SA (step S 12). What is here termed the direction of the steering indicates whether the steering wheel 8 is steered in to the left or right direction from the center position, and takes any of the values "right", "center", or "left".

Next, the control unit calculates the change in the amount of the steering angle at the time interval described above, that is, the steering angle speed (rad/sec) as the differential value of the amount of steering (step S 13). This is in order to differentiate precisely the steering state using the direction of the steering angle speed. For example, the process when the steering wheel 8 returns to the central position again after turning to the left can only be differentiated by the steering direction, and thus the direction of the steering angle speed is necessary.

Figure 9:
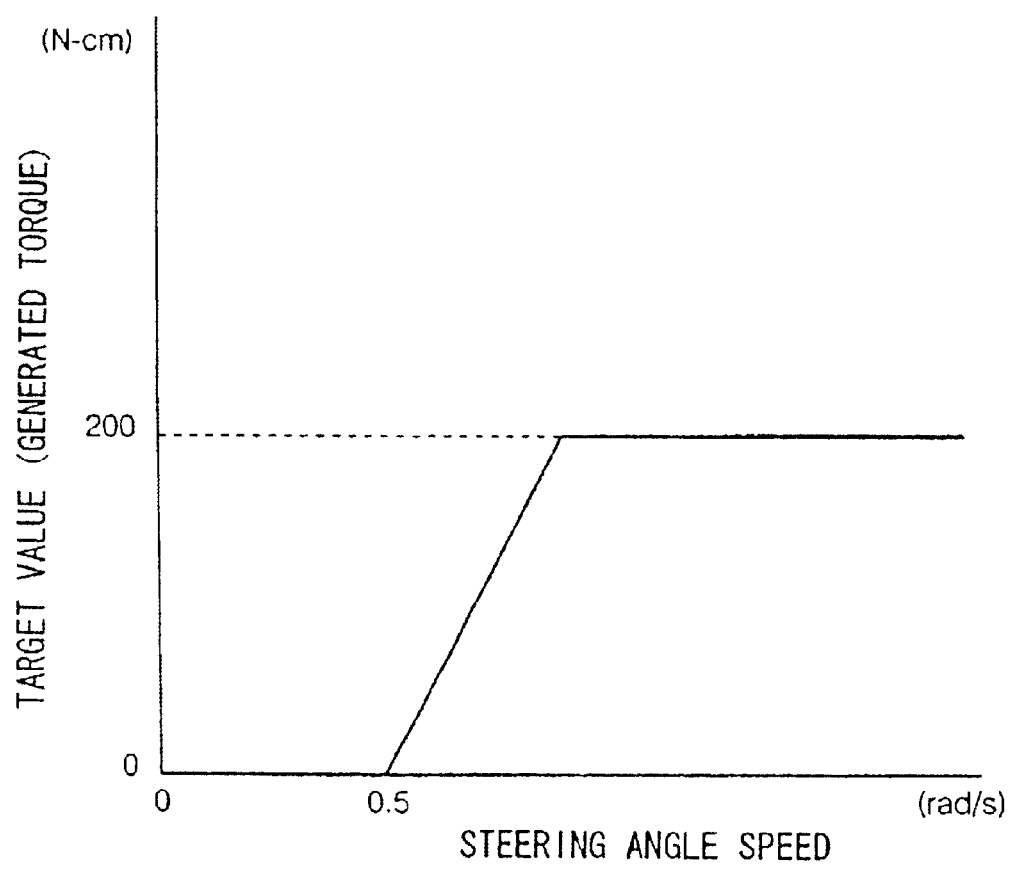
FIG. 9 is a target value map that defines a relationship between steering angle speed and torque.

Next, the control unit finds the target values depending on the steering angle speed found in step S 13 by referring to a target value map stored in the storage unit. FIG. 9 is an example of a target value map that defines the relationship between the steering angle speed and the torques generated by the actuators 1L and 1R. The control unit selects each of the torques TR and TL corresponding to the steering angle speed by referring to the tangent value maps, and outputs this as the calculation result. This output is sent to the processing described below (the processing shown in FIG. 5).

Next, the calculation processing of the target values (YL and YR) based on the amount of the stroke will be explained with reference to FIG. 4. First, the control unit reads each of the measured values MDL and MDR from the stroke sensors SL an SR. In addition, the control unit calculates the difference between the measured value and the reference value, that is, the amount of the stroke (step S 22).

Specifically, the control unit finds the stroke amount ΔDL of the left rear wheel by calculating the formula "MDL-DL", similarly finds the stroke amount ΔDR of the right rear wheel by calculating the formula "MDR−DR", and stores these in the storage unit. By these calculations, the change in the amount of the stroke can be found subsequent to the state when the ignition switch is turned ON.

Next, the control unit finds the stroke difference ΔLR between the stroke amount ΔDL of the left rear wheel and the stroke amount ΔLR of the right rear wheel found in step S 22 by calculating the equation "ΔDL−ΔDR" (step S 23). Next, the control unit determines the state of the vehicle based on the stroke difference ΔLR that has been found (step S 24). The control unit determines that the vehicle body B is "centered" with respect to the road surface when the stroke difference ΔLR=0, determines that the vehicle body B is "turning right" when the stroke difference ΔLR >0, and determines that the vehicle is "turning left" when the stroke difference ΔLR <0. The results of this determination are stored together with the stroke difference ΔLR in the storage unit as the vehicle state value.

Next, the control unit calculates the target values based on the stroke difference ΔLR (step S 25).

Specifically, the stroke difference ΔLR (mm) is multiplied by the spring rate difference ΔJ between the target spring rate JT (unit: N/mm, where N is a Newton) set corresponding to the vehicle type and the basic spring rate JS (unit: N/mm) of the spring 7L actually installed in the suspension, and the resulting value serves as the roll resistance amount of the force FW by which the reaction force is insufficient.

Therefore, the control unit carries out a calculation based on the equation "(JT-JS)×ΔLR" to find the force FW by which the reaction force is insufficient.

In addition, the torques TL and TR that are generated by each of the actuators 1L and 1R are the torques necessary for compensating the spring rate difference ΔJ, which is amount by which the base spring rate JS is insufficient with respect to the target spring rage JT, and the lever ratio DD (the approximate length of the drive arms 4L and 4R; unit: cm) is multiplied by the force FW by which the reaction force is insufficient found above.

Thus, the control unit carries out calculations based on the equation "(FW×DD)/2" to find each of the torques YL and YR. Here, the reason for dividing "FW×DD" by 2 is that for the torque necessary to complement the roll resistance (the apparent increase in the spring rage), the complementary actuators 1L and 1R each generate ½ the torque towards the reaction directions.

Next, the control unit applies a sign to the "(FW×DD/2)" found above depending on whether the vehicle state value is "turning right" or "turning left", and calculates the torques YL and YR. The torques YL and YR found by this calculation serve as target values based on the amount of the stroke.

For example, in the case that the driver turns to the right and the vehicle body B rolls to the left, the control unit calculates the torque TL(+FW×DD/2) in order to apply a reaction force in the direction in which the actuator 1L lengthens the spring 7L, while in contrast calculates the torque YR(−FW×DD/2) in order to apply a reaction force in the direction in which the actuator 1R shortened the spring 6R. Below, for the sake of explanation, the torque in the direction of a lengthening of a spring is denoted-by "+", and the torque in the direction of a shortening of a spring is denoted by "−".

Next, the control unit determines whether or not the vehicle state should be treated as "center" based on the vehicle state value and the stroke difference ΔLR (step S 26). This determination determines whether the amount should be treated as substantially 0 even though the stroke difference ΔLR is not 0, and if the stroke difference ΔLR is within a range determined in advance, the stroke is processed as 0. Thereby, the vehicle state will be treated as "center" even if there is a minor stroke difference.

In the case that the result of this determination is not treated as "center", the control unit stores in the storage unit the values of the torques YL and YR found in step S 25, and the processing ends.

In contrast, in the case that the vehicle state is to be treated as "center", the control unit sets the vehicle state value to "center", and the torques YL and YR, which are the target values based on the stroke found above, are set to "0" (step S 27), these are stored in the storage unit, and the processing ends.

Next, the processing unit in which the target values (torques TTL and TRR) actually generated by the actuators 1L and 2R are found using the target values (TL and TR) based on the steering angle speed and the target values (YL and YR) based on the stroke amount will be explained with reference to FIG. 5.

First, the control unit carries out a determination of whether or not the vehicle state value is "center" (step S 31), and if the result of the determination is "center", the processing proceeds to step S 34. If the vehicle state is not "center", the processing proceeds to step S 32.

Next, based on the vehicle state value and the speed and direction of the steering speed angle, the control unit determines whether or not the direction of the roll of the vehicle body B (either the RL direction of a left turn or the RR direction of a right turn shown in FIG. 1) agrees with the direction of the steering angle speed (step S 32). Normally, due to the centrifugal force generated during turning, the vehicle body B rolls in the direction opposite to that of the steering angle. However, in the case of quick steering, there are cases in which the direction of the steering angle speed and the direction of the roll agree because the roll is generated at a timing that is delayed from the start of the steering.

The result of this determination, in the case that the roll direction and the speed and direction of the steering angle speed agree, only a target value based on the amount of stroke is output.

Specifically, the control unit outputs the torques YL and YR found from the stroke difference ΔLR as the torques TTL and TTR of the target values.

In contrast, in the case that the direction of the roll and the direction of the steering angle speed do not agree, the target value based on the steering angle speed and the target value based on the amount of stroke are added and output (step S 34).

Specifically, the control unit calculates the torque TTL generated by the actuator 1L based on the equation "YL+TL", calculates the torque TTR generated by the actuator 1R based on the equation "YR+TR", and outputs the torques TTL and TTR found by these calculations as the target value of the torque of.

Next, the operation in which the target values in the case that sky hook control shown in step S 2 of FIG. 2 is calculated is explained with reference to FIG. 6.

First, the control unit reads the acceleration GB in the vertical direction, which is the output of the acceleration sensor SB that outputs the acceleration of the vehicle body B in the vertical direction (step S 41). Next, the control unit calculates the cancel value for canceling the DC offset portion included in the acceleration GB in the vertical direction (step S 42). This cancel value DC(k) is calculated by the following equation:

$$DC(k)=(0.75/(0.75+T))\cdot(DC(k-1)+GB(k)-GB(k-1),$$

where T denotes the sampling time, GB denotes the acceleration in the vertical direction, k denotes the newest value, k-1 denotes the value used in the previous calculation processing.

Next, the control unit calculates the speed y(k) of the spring (vehicle body B) (step S 43). This speed y(k) is calculated by the following equation:

$$y(k)=(1/(1.3+T))\cdot(1.3y(k-1)+T\cdot DC(k)),$$

where T denotes the sampling time and DC denotes the cancel value calculated in step S 42. In addition, k denotes the newest value, and k-1 is the value used in the previous calculation processing.

Next, the control unit determines the operation direction of the actuators 1L and 1R based on the value of the speed y(k) calculated in step S 43 (step S 44). If the determination of the direction of the operation is that the spring speed y(k) is a positive value, the actuators 1L and 1R operation in the shortening direction, and if the value is negative, the operation is in the lengthening direction.

Next, the control unit calculates the torques TTL and TTR of the target values based on the value of the spring speed y(k) (step S 45).

The target values TTL and TTR are calculated by the formula TTL, TTR=|y(k)|·C·K, where C denotes the damping coefficient and K denotes the torque constant.

Next, the operation in which the calculation of the target values for carrying out pitching suppressing control shown in step S 3 in FIG. 2 will be explained with reference to FIG. 7.

First, the control unit reads the current acceleration GC, which is the output value of the current acceleration sensor SC that detects the acceleration of the vehicle B in the current direction (step S 51). In addition, the control unit determines the direction of the reaction force generated by the actuators 1L and 1R based on the current acceleration GC that has been read (step S 52). The direction of the reaction force is determined by identifying whether the vehicle is accelerating or decelerating based on the value of the current acceleration GC. In the case that the vehicle is accelerating, the springs 7L and 7R in the rear wheels are lengthened because the load shifts towards the back. In contrast, during deceleration, the springs 7L and 7R in the back wheels are lengthened because the load shifts to the front. Therefore, when acceleration is identified, the direction in which the reaction force is generated is the direction in which the springs 7L and 7R lengthen, while in contrast, when deceleration is identified, the direction in which the reaction force is generated is the direction in which the springs 7R and 7L shorten.

Next, the control unit calculates the amount of shift of the load due to acceleration (step S 53). The load shift amount $\Delta W$ is calculated by the following equation:

$$\Delta W = (\tfrac{1}{2}) \cdot (hg/L) \cdot W \cdot Xg,$$

where hg is the height of the center of gravity of the vehicle, L is the wheel base of the vehicle, W is the center of gravity of the vehicle, and Xg is the absolute value of the current acceleration GC. Next, the control unit calculates and outputs the target value TTL for one of the actuators (step S 54). The reaction force of the load shift amount A W can be generated simultaneously in the same direction by the two actuators 1L and 1R, and thus the target value torques TTL and TTR can be found by the formula TTL, TTR=$\Delta W$/2.

Figure 11:
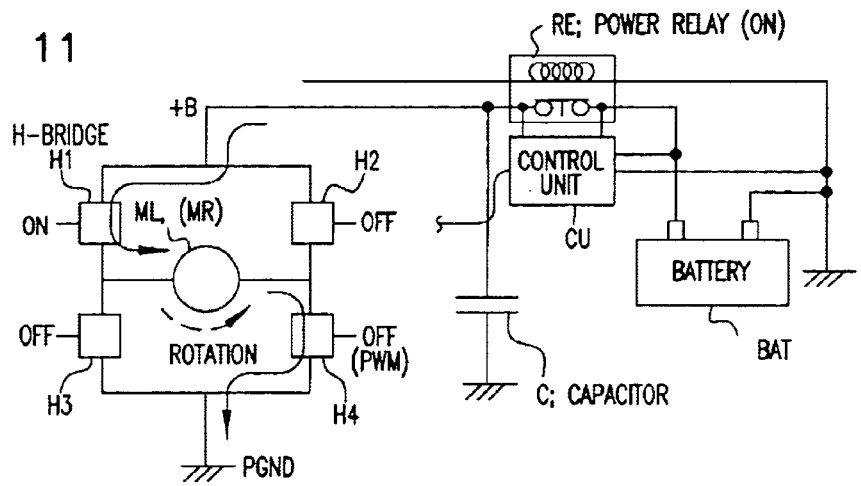
FIG. 11 is an explanatory drawing showing the motor drive operation during roll suppressing and pitching suppressing control.
Figure 12:
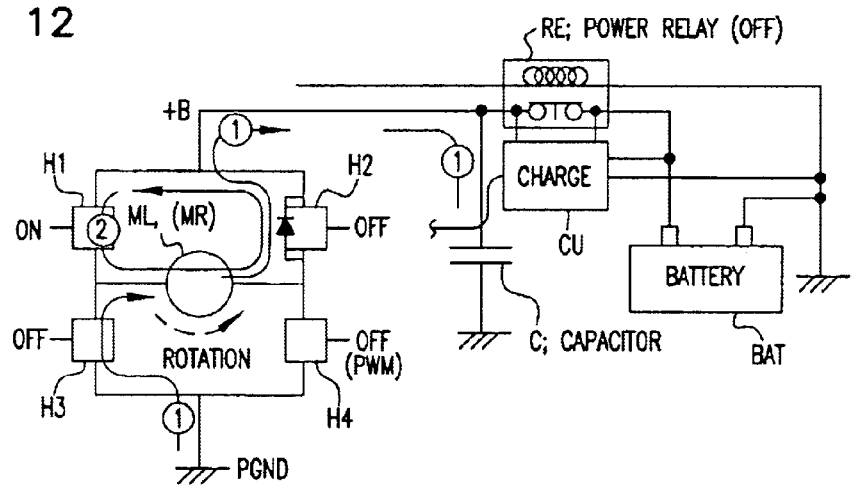
FIG. 12 is an explanatory drawing showing the operation of charging during sky hook control.
Figure 13:
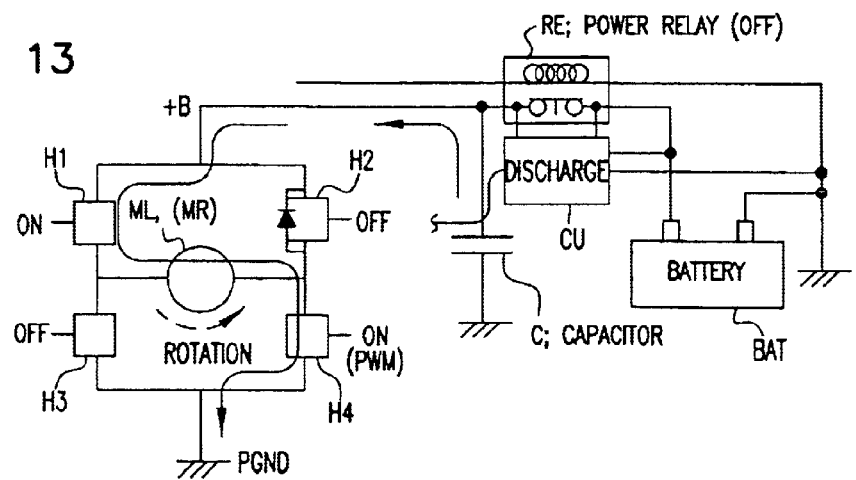
FIG. 13 is an explanatory drawing showing the operation of discharging during sky hook control.

Here, the operation in which the power generation is carried out using the energy of the vertical motion of the wheels WL and WR and the obtained electrical power is used to drive the actuators 1L and 1R will be explained with reference to FIGS. 11 to 14. In FIGS. 11 to 13, the reference symbol BAT is a battery (secondary battery) provided in advance in the vehicle for driving the electrical equipment in the vehicle. Reference symbols H1 to H4 are FET (field-effect transistors) for driving the motors ML and MR, and the structure of the FETs H1 to H4 is called an H-bridge structure. In these four FETs, ON/OFF driving and PWM driving are carried out by control signals from the control unit CU. Reference symbol C is a capacitor for carrying out discharging or charging in order to drive the motors ML and MR. Reference symbol RE is a power relay, and depending on commands from the control unit CU, supplies or stops supplying voltage of the battery BAT to the H-bridge.

FIG. 11 is a drawing showing the operation during the roll suppressing control and the pitching suppressing control. First, in step S 4, in the case that the identified control mode is the roll suppressing control or the pitching suppressing control, the control unit turns ON the power relay RE. Thereby, the voltage of the battery BAT is supplied to the H-bridge. In addition, in the case that the motor ML is being rotated to the left, the control unit turns ON the FET H1, turns OFF the FET H2, turns OFF the FET H3, and turns ON the FET H4 (PWM drive), and current flows to the motor ML. In addition, in these case that the motor ML is being rotated to the right, the control unit turns OFF the FET H1, turns ON the FET H2, turns ON the FET H3 (PWM drive), and turns OFF the FET H4, and the current flows to the motor ML. Thereby, roll suppressing control and pitching suppressing control are carried out.

FIGS. 12 and 13 are drawings showing the operation during sky hook control, where FIG. 12 shows the charging operation and FIG. 13 shows the discharging operation. First, in step S 4, in the case that the identified control mode is the sky hook control and the capacitor C is charged, the control unit turns OFF the power relay RE. Thereby, the power source supply from the battery BAT is stopped. At this time, an electromotive force is generated from the motor ML due to the wheels moving (the lengthening or shortening of the suspension) in a certain direction (in an upward direction or downward direction) due to bumps and holes in the road surface. In addition, the control unit turns ON the FET H1, turns OFF the FET H2, turns OFF the FET H3, and turns OFF the FET H4. Thereby, the regenerative braking current generated by the motor ML temporarily charges the capacitor C by passing through the parasitic diode (the flow shown by ① in FIG. 12). In addition, when the charging is complete, there is reflux as shown by ② in FIG. 12.

In contrast, as shown in FIG. 13, in the case of discharging, the control unit turns the power relay OFF, and at the same time, turns ON the FET H1, turns OFF the FET H2, turns OFF the FET H3, and turns ON the FET H4 (PWM drive). Thereby, the motor ML is driven by the electricity stored in the capacitor C, and the force for dampening the spring is generated. This dampening force becomes large in proportion to the amount of the regenerative braking current, and the control of this amount of regenerative braking current is carried out depending on the duty ratio of the PWM that is driving the FET H4. Like the sky hook control, control is carried out such that the duty ratio changes depending on the deviation of the target current value and the regenerative braking current value, and if the deviation is large, the duty also becomes large.

Moreover, only in the case that a large road surface input is continuously received such that it cannot be absorbed in the dampening operation, the power relay RE can be turned ON, the voltage from the battery BAT can be applied, and the driving force of the actuator can be increased. In addition, in the case of transferring to roll suppressing control in order to increase the roll resistance during turning, at the same time as the transition, the power relay is turned ON, and thereby power of the battery BAT is supplied to the motor ML. Thereby, the driving stability is increased by increasing the out of phase wheel rate. Furthermore, in the case of transferring to pitching suppressing control, like the roll suppressing control, the power of the battery BAT is supplied. This is because the situation in which this control is carried out is limited to the acceleration or deceleration of the vehicle, and because the amount of vertical movement of the tires is small and the electromotive force of the motors ML and MR is almost zero.

Figure 14:
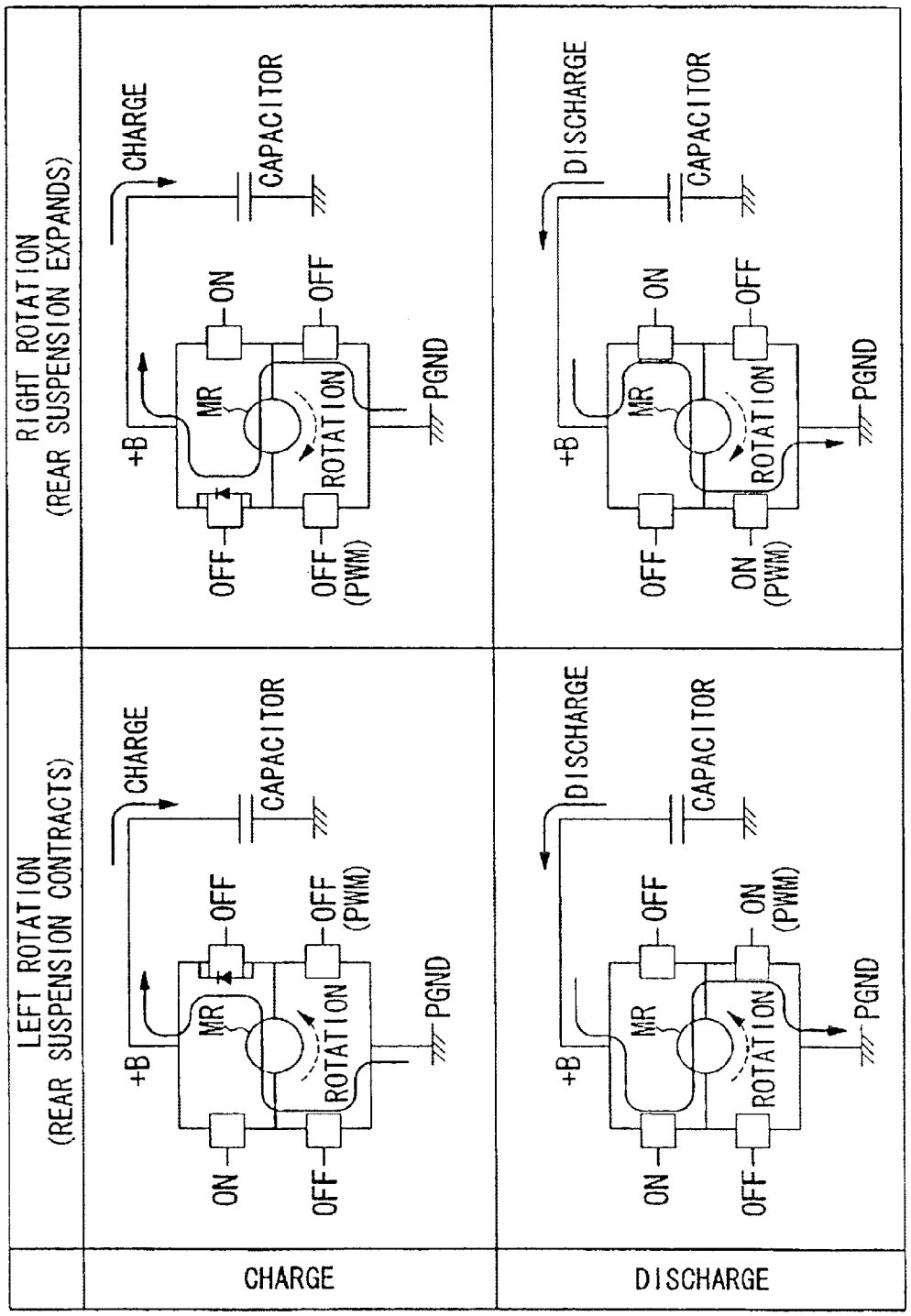
FIG. 14 is a schematic diagram showing the division of the charging and discharging events for each of the rotation directions of the motors.

FIG. 14 is a schematic diagram showing the operation of the motor MR provided on the vehicles right side, and is a drawing wherein the operation of the FETs in the case that the motor MR turns left and turns right is shown separately depending on whether there is a charging and discharging event. As shown in the figure, the control of the actuator that applies force in the vertical direction to the wheels is carried out by driving the FETs depending on the rotation direction and whether they are a charging or discharging, and at the same time, electrical generation is carried out by using the energy of the vertical motion of the wheels, and the obtained electrical power can be used for driving the actuators.

Moreover, the direction of rotation of the motor MR is determined by the sign of the value of the of the voltage value subtracted from the output value of the acceleration sensor SB.

Figure 8:
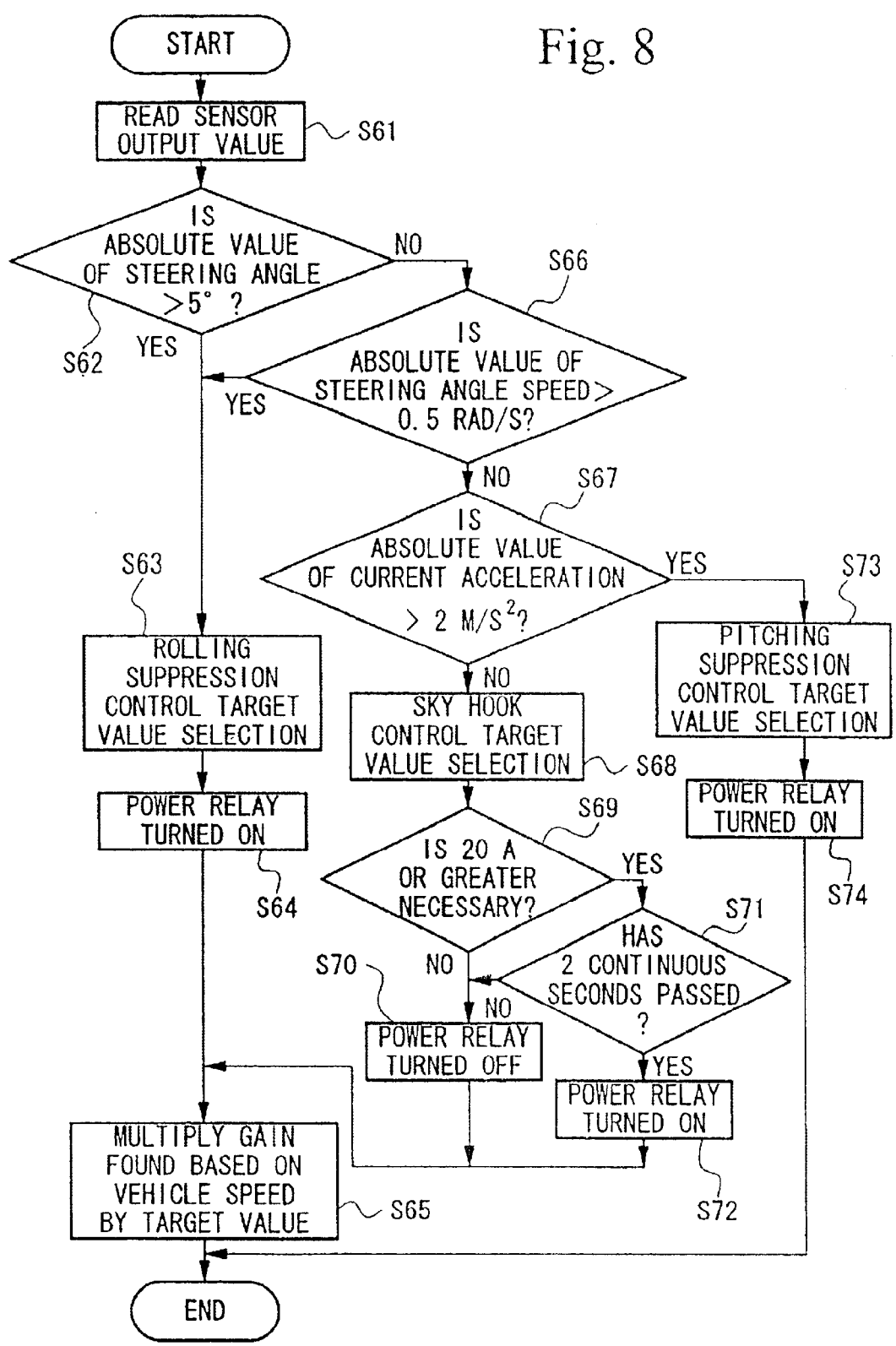
FIG. 8 is a flowchart showing the detailed processing in step S 4 shown in FIG. 1.

Next, the control mode determination shown in step S 4 of FIG. 2 and the operation that carries out the charging/discharging of the regenerative braking that accompanies the central mode will be explained with reference to FIG. 8.

First, the control unit reads the sensor output values (step S 61). The sensor output values read here are obtained during the processing operation in which the target values described above are obtained, and the output values stored in the storage unit are read. In addition, the control unit determines whether or not the absolute value of the steering angle is larger than 5° (step S 62). In the case that the result of this determination is that it is larger than 5°, it is determined that the vehicle is turning, and the target values for roll suppressing control are selected (step S 63). In addition, the control unit turns ON the power relay RE (step S 64). Thereby, control is carried out in which the voltage of the battery BAT is supplied to the H-bridge, and each FET, as described above, is driven depending on control signals from the control unit.

Figure 10:
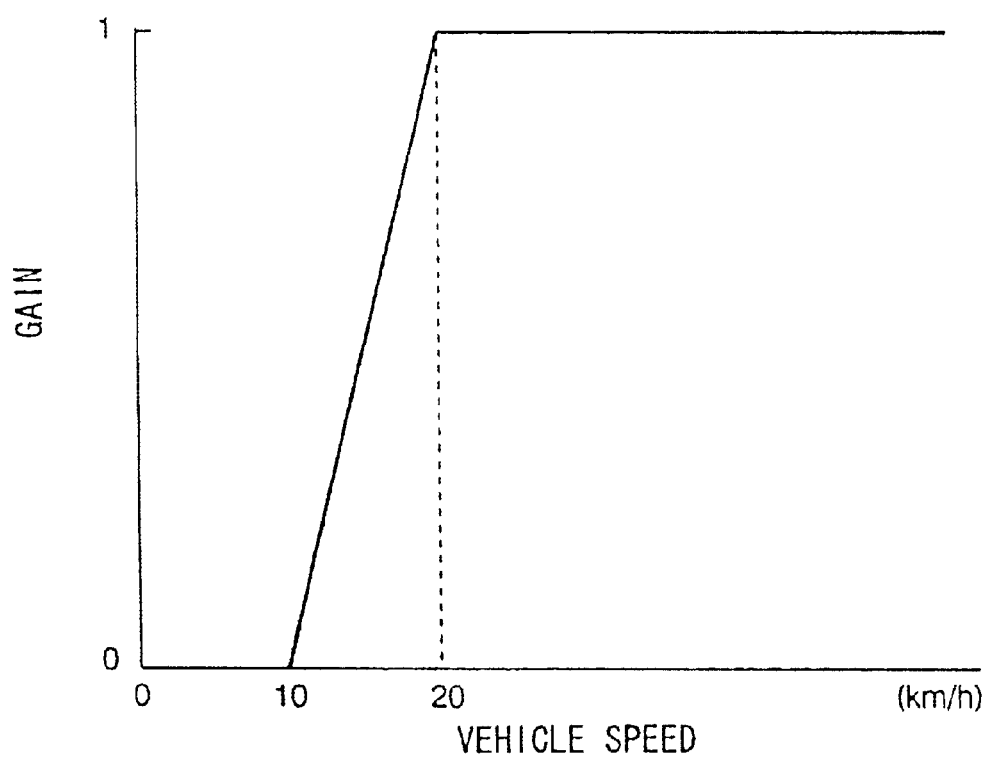
FIG. 10 is a gain map that defines a relationship between vehicle speed and gain.

Next, the control unit multiplies the gain found based on the vehicle speed at this point in time by the selected target values (step S 65). The gain multiplied by these target values is found by referring to the gain map shown in FIG. 10 that defines the relationship between the vehicle speed and the gain. As shown in FIG. 10, in the gain map the X axis is the vehicle speed and the Y axis is the gain, and the gain is a value from 0 to 1. In the example shown here, the gain is 0 when the vehicle speed of 0 to 10 km/h, and the gain is 1 when the vehicle speed is equal to or greater than 20 km/h. Between but not including 10 to 20 km/h, the gain is found by linear interpolation.

Therefore, this means that when the vehicle speed is between 0 to 10 km/h, control by the actuators 1L and 1R is not carried out, and when the vehicle speed is equal to or above 20 km/h, control is carried out by the target values set in step S 63.

In this manner, by multiplying the gain by the target values, the target values can be changed depending on the speed of the vehicle, and thus at a low speed less than 10 km/h, minor control operations are carried out due to the influence of bumps and holes in the road surface, and a deterioration in the ride comfort can be avoided.

Next, in step S 62, in the case that the absolute value of the steering angle is equal to or less than 5°, the control unit determines whether or not the absolute value of the steering angle speed is larger than 0.5 rad/sec (step S 66). In the case that the result of the determination is that the absolute value of the steering angle speed is larger than 0.5 rad/sec, the steering angle is small while the steering angle speed is high, and thus it is determined that the possibility that rolling will occur is high, and the processing proceeds to step S 63, and the processing described above is carried out.

In contrast, in the case that the absolute value of the steering angle speed is equal to or less than 0.5 rad/sec, the control unit determines whether or not the absolute value of the current acceleration is larger than 2 m/s$^2$ (step S 67). In the case that the result of this determination is that the absolute value of the current acceleration is equal to or less than 2 m/s$^2$, the control unit selects the target values for the sky hook control (step S 68). In addition, the control unit determines whether the necessary current is equal to or greater than 20 A (step S 69). In the case that the result of this determination 20 A or greater is necessary, the control unit turns OFF the power relay RE (step S 70). Thereby, the supply of the voltage of the battery BAT to the motors ML and MR is stopped, and by a control signal from the control unit, control is carried out for driving each of the FETs as described above, and the charge and discharge of the capacitor C is carried out.

Next, in the case that the necessary current resulting from the determination in step S 69 is equal to or greater than 20 A, the control unit determines whether or not the state requiring 20 A or greater has continued for two seconds (step S 71). If the result of this determination is that two seconds have not passed, the processing proceeds to step S 70. In contrast, in the case that two seconds have passed, the control unit turns ON the power relay RE (step S 72). Thereby, the current of the battery BAT is supplied to motors ML and MR, and by control signals from the control unit, the control in which each FET is driven as described above is carried out. After carrying out step S 70 or S 72, the processing proceeds to step S 65, and the gain is multiplied by the found target values based on the speed.

In addition, in the case that the result of the determination in step S 67 is that the absolute value of the current acceleration is larger than 2 m/s$^2$, the control unit selects the target values of the pitching suppressing control (step S 73). In addition, the control unit turns ON the power relay RE (step S 64). Thereby, the voltage of the battery BAT is supplied to the motors ML and MR, and by control signals from the control-unit, control in which each of the FETs is driven as described above is carried out. In the case that the target values of the pitching suppressing control are selected, the control unit does not carry out multiplying the gain based on the vehicle speed (step S 64). This is because the control unit detects whether or not the current acceleration is equal to or greater than a predetermined value at which pitching occurs easily, and thus multiplying the gain based on the vehicle speed is not necessary in order to carry out a determination of pitching suppressing control based on the absolute value of the current acceleration.

Moreover, the explanation described above was given in which the power generated by the MR was charged in the capacitor C shown in FIGS. 11 to 14, but this can be charged to a battery BAT provided in advance in the vehicle. In this case as well, the capacity of the battery provided in the vehicle does not have to be made large because the motor itself generates the energy that the motors ML and MR require.

In this manner, based on the output value of the sensor provided in the vehicle, the state of the vehicle body B is determined depending on whether or not predetermined conditions have been satisfied, and in the case that as a result of the examination it is determined that the vehicle is in a turning state, control is carried out in which the rolling is suppressed with respect to the suspension, and thereby an effect can be obtained that is identical to the case in which only the spring rate of the suspension is made large only during turning.

In addition, in the case that as a result of the determination it is determined that the vehicle is progressing straight forward, control is generally carried out in which the bouncing is suppressed with respect to the suspension, and the ride comfort is improved, and thereby, an effect can be obtained that is identical to the case in which the spring rate of the suspension is made small while progressing straight forward.

In addition, in the case that as a result of the determination it is determined that the vehicle is progressing straight forward and accelerating or decelerating, generally control is carried out in which the pitching is suppressed, and thus an effect can be obtained that is identical to the case in which the spring rate of the suspension is made large only during acceleration and deceleration.

Furthermore, during the sky hook control for improving the ride comfort, power generation is carried out by the motors depending on the vertical movement of the wheels, and the storage cycle in which power is stored in the storage apparatus and the discharge cycle in which the motor is driven by the power stored in the storage apparatus are repeated, and thereby the effect can be attained wherein the consumption of the power required to drive the motors that control the suspension can be saved. As a result, it becomes possible to provide motors ML and MR for carrying out control of the suspension can be provided without increasing the storage capacity of the battery BAT that was originally installed for driving the electrical equipment of the vehicle.

In addition, further providing in the vehicle a capacitor C having a storage capacity smaller than the battery BAT provided in advance and a power relay RE that controls the connection between the battery BAT and the motors ML and MR, in the storage cycle the connection between the battery BAT and the motors ML and MR is cut and electricity is stored in the capacitor C, and thereby charging and discharging can be carried out without providing complicated control circuits, and the structure can be simplified.

In addition, when controlling the ride comfort of the vehicle during forward travel in a typical area (sky hook control), the motors ML and MR are driven by the power stored in the capacitor C, and thereby the savings of necessary power consumption can be efficiently carried out, and further energy saving can be implemented.

Moreover, in the explanation given above, the case of providing actuators 1L and 1R on the rear wheels of the vehicle was explained, but actuators can similarly be provided on the front wheel suspensions as well, and the control described above carried out. Furthermore, control of each of the vehicle's four wheels can be carried out by providing actuators on all the suspensions of the front and rear wheels. In addition, only one capacitor C needs to be provided in a vehicle, not provided for each of the left and right motors ML and ML, and used by both the two motors ML and MR. In addition, instead of a capacitor C, a secondary battery having a storage capacity less than the battery BAT can be provided.

As explained above, according to the first aspect of the invention, power generation is carried out by a motor depending on the vertical motion of the wheels, and repeating a storage cycle that stores electricity in a storage apparatus and a discharge cycle that drives the motors by the electrical power stored in the storage apparatus, and thereby the effect can be attained where consumption of necessary power for driving the motors that control the suspension can be reduced. As a result, the storage capacity of the battery originally provided for driving the electrical equipment of the vehicle does not need to be increased, and a motor for carrying out control of the suspension can be provided.

In addition, according to a second aspect of the invention, a storage apparatus comprises two storage parts having different storage capacities, and a connection control device is provided that control the connection between the main storage member having a large storage capacity and the motors. During the storage cycle, the connection between the main storage member and the motors is cut by the connection control device and the auxiliary storage member having a small storage capacity is charged. Thereby, the effects can be attained that charging and discharging can be realized without providing complicated control circuits for carrying out charging and discharging of the auxiliary storage apparatus having a small storage capacity, and the structure can be simplified.

In addition, according to a third aspect of the invention, when controlling the ride comfort of the vehicle during forward travel in normal area, the motors are driven by power stored in the auxiliary storage apparatus, and thereby saving of necessary power consumption can be efficiently carried out, and further energy saving can be implemented.

What is claimed is:

1. A suspension control apparatus of a vehicle, the vehicle having vehicle wheels, comprising:

a wheel motor that uses vertical movement due to one of said wheels;

a power storage apparatus comprising a main storage member and an auxiliary storage member, said auxiliary storage member having a storage capacity smaller than a storage capacity of the main storage member;

a control unit; and a relay device controlled by said control unit that turns connection one of on and off between said main storage member and said motor;

wherein, said suspension control apparatus carries out power generation by the wheel motor depending on the vertical movement of said vehicle wheels, and the suspension control apparatus repeatedly performs a storage cycle wherein electrical power generated by the motor is stored in said auxiliary storage member and a discharge cycle wherein said motor is driven by the electrical power stored in said power storage apparatus, and wherein, at the start of the storage cycle, the connection between said main storage member and said motor is turned off by said relay device, and said auxiliary storage member is charged.

2. A suspension control apparatus according to claim 1 wherein:

said motor is driven by said auxiliary storage member when the suspension control apparatus carries out control of ride comfort of the vehicle, and said motor is driven by said main storage member when carrying out control other than the ride comfort of the vehicle.

* * * * *